US009410219B2

(12) United States Patent
Yoon et al.

(10) Patent No.: US 9,410,219 B2
(45) Date of Patent: Aug. 9, 2016

(54) HEAT TREATMENT DEVICE FOR CRANK SHAFT

(71) Applicant: Hyundai Motor Company, Seoul (KR)

(72) Inventors: Woojun Yoon, Asan-si (KR); Hee Myoung Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 295 days.

(21) Appl. No.: 14/135,267

(22) Filed: Dec. 19, 2013

(65) Prior Publication Data

US 2014/0183174 A1   Jul. 3, 2014

(30) Foreign Application Priority Data

Dec. 28, 2012   (KR) .................. 10-2012-0157515

(51) Int. Cl.
| | |
|---|---|
| *B23K 26/02* | (2014.01) |
| *C21D 1/09* | (2006.01) |
| *C21D 9/30* | (2006.01) |
| *B23K 26/06* | (2014.01) |

(52) U.S. Cl.
CPC .. *C21D 1/09* (2013.01); *C21D 9/30* (2013.01); *B23K 26/06* (2013.01); *B23K 2201/005* (2013.01)

(58) Field of Classification Search
CPC ............... B23K 2201/005; B23K 26/0066; B23K 26/06–26/0617; B23K 26/0823; C21D 1/09; C21D 2221/00; C21D 2221/10; C21D 9/30; Y10T 74/2173

USPC .......................................... 219/121.6–121.83
See application file for complete search history.

(56) References Cited

U.S. PATENT DOCUMENTS

| | | | | |
|---|---|---|---|---|
| 5,654,125 A * | 8/1997 | Fan | ........................ | B41C 1/05 430/306 |
| 6,354,213 B1 * | 3/2002 | Jenkins | .................. | B41F 35/04 101/483 |
| 6,549,309 B1 * | 4/2003 | Monaghan | ......... | B23K 26/0084 359/1 |
| 7,985,941 B2 * | 7/2011 | Corrigan | ............ | B23K 26/0823 219/121.68 |

FOREIGN PATENT DOCUMENTS

| | | |
|---|---|---|
| JP | 2001-262230 A | 9/2001 |
| JP | 2009-35760 A | 2/2009 |
| KR | 10-1202117 B1 | 11/2012 |

OTHER PUBLICATIONS

English Machine Translation of KR Registration No. 10-1202117, Nov. 2012.*

* cited by examiner

*Primary Examiner* — Sang Y Paik
(74) *Attorney, Agent, or Firm* — Morgan, Lewis & Bockius LLP

(57) ABSTRACT

A crankshaft heat treatment device may include a base frame, a jig frame in which a crankshaft is rotatably supported and that is disposed to be able to move in a horizontal direction and in a vertical direction at the base frame, and a laser unit that is disposed in a predetermined fixed position and irradiates laser beam to a pin portion and a journal portion of the crankshaft so as to treat the pin portion and the journal portion with heat.

14 Claims, 3 Drawing Sheets

HEAT TREATMENT DEVICE FOR CRANK SHAFT

CROSS-REFERENCE TO RELATED APPLICATION

The present application claims priority of Korean Patent Application Number 10-2012-0157515 filed Dec. 28, 2012, the entire contents of which application is incorporated herein for all purposes by this reference.

BACKGROUND OF INVENTION

1. Field of Invention

The present invention is related to a crankshaft heat treatment device that can treat a crankshaft with heat.

2. Description of Related Art

An engine component like a crankshaft and a camshaft is fabricated to a complete product through a various processes after a shaft body is shaped through a forging or a casting process on an engine fabrication line.

Here, a crankshaft is supported by a journal bearing in a crank room to transform a linear movement of a piston to a rotation movement. The crankshaft includes a journal portion, and a pin portion that is connected to a connecting rod.

Meanwhile, a journal portion and a pin portion of a crankshaft is treated with heat so as to prevent the damage that is caused by friction and abrasion in a crankshaft fabrication process.

As an example, a private coil is disposed on an exterior circumference of a journal portion and a pin portion of a crankshaft and electric power is transmitted to the coil to apply high frequency induction heat on the journal portion and the pin portion, which is a heat treatment device using a high frequency method.

However, the crankshaft heat treatment method of the above high frequency induction heat method increases facility investment cost and the poor setting of the coil can cause defect product.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made to provide for a crankshaft heat treatment device having advantages of being able to treat a pin portion and a journal portion with heat by irradiating laser beam to a rotating crankshaft.

Various aspects of the present invention provide for a crankshaft heat treatment device having advantages of applying a circular arc interpolation jig so as to enable a laser heat treatment of a pin portion that eccentrically rotates.

A crankshaft heat treatment device according to various aspects of the present invention may include a base frame, a jig frame in which a crankshaft is rotatably supported and that is disposed to be able to move in a horizontal direction and in a vertical direction at the base frame, and a laser unit that is disposed in a predetermined fixed position and irradiates laser beam to a pin portion and a journal portion of the crankshaft so as to treat the pin portion and the journal portion with heat.

A circular arm interpolation of the jig frame may be performed based on an eccentric rotation of the pin portion.

The crankshaft heat treatment device may further include a rotation unit that is disposed on the jig frame to rotate the crankshaft, a first moving unit that is disposed on the base frame to move the jig frame along a rotating direction of the crankshaft in a horizontal direction, and a second moving unit that is disposed on the first moving unit to move the jig frame along a rotating direction of the crankshaft in an up and down direction.

The rotation unit may include a drive motor that is disposed at one side of the jig frame to be connected to one side end portion of the crankshaft, and a support cylinder that is disposed at the other side of the jig frame to rotatably support the other side end portion of the crankshaft.

The support cylinder may rotatably support the other side end portion of the crankshaft through an operation of an operating rod to correspond to the other end portion of the crankshaft.

An operating rod of the support cylinder may be connected to the other side end portion of the crankshaft through a bearing.

The first moving unit may include a first moving plate that is disposed on the base frame to be movable in a horizontal direction along a rotating direction of the crankshaft, a first servo motor that is disposed on the base frame to correspond to the first moving plate, and a first lead screw that is connected to the first fixation block that is fixed on a lower surface of the first moving plate and the first servo motor.

The first moving plate may be disposed on the first guide rail disposed on an upper surface of the base frame to be movable in a horizontal direction through the first rail block.

The second moving unit may include a guide element that is disposed on the first moving unit and both sides of the jig frame are engaged therewith to be slidably movable in an up and down direction, a second servo motor that is disposed on the first moving unit to correspond to the jig frame, and a second lead screw that is connected to the second fixation block fixed on a lower surface of the jig frame and the second servo motor.

The second fixation block may be a pipe nut that is fixed on a lower surface of the jig frame in an up and down direction.

The second moving unit may include a guide element that is disposed at both sides of the first moving plate in an up and down direction and both sides of the jig frame is engaged therewith to be slidably movable in an up and down direction, a second servo motor that is disposed on an upper surface of the first moving plate to correspond to a lower surface of the jig frame, and a second lead screw that is connected to the second fixation block fixed on a lower surface of the jig frame and the second servo motor.

The jig frame may be disposed on the second guide rail formed on the guide element to be movable in an up and down direction through the second rail block.

The laser unit may include a laser optic head that is disposed on a predetermined moving device through a mounting bracket and irradiates laser beam generated by a laser generator onto the pin portion and the journal portion of the crankshaft.

The laser optic head may be disposed to be movable in a horizontal direction along axis Y through the moving device, when a horizontal moving direction of the jig frame is defined as an axis X.

The laser optic head may irradiate laser beam of conduction welding area onto the pin portion and the journal portion.

A laser beam may irradiate to a crankshaft to treat a journal portion and a pin portion with heat, and therefore a facility investment cost can be reduced compared to a heat treatment device of a high frequency method.

The position of a jig frame may be compensated in a circular arc interpolation method based on a pin portion of a crankshaft that eccentrically rotates, and therefore a laser beam disposed in an equal position can be applied to a pin portion through a laser optic heat.

Accordingly, in various embodiments of the present invention, there is no need to compensate a focus area of a laser beam and a configuration of a laser optic heat can be simplified.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
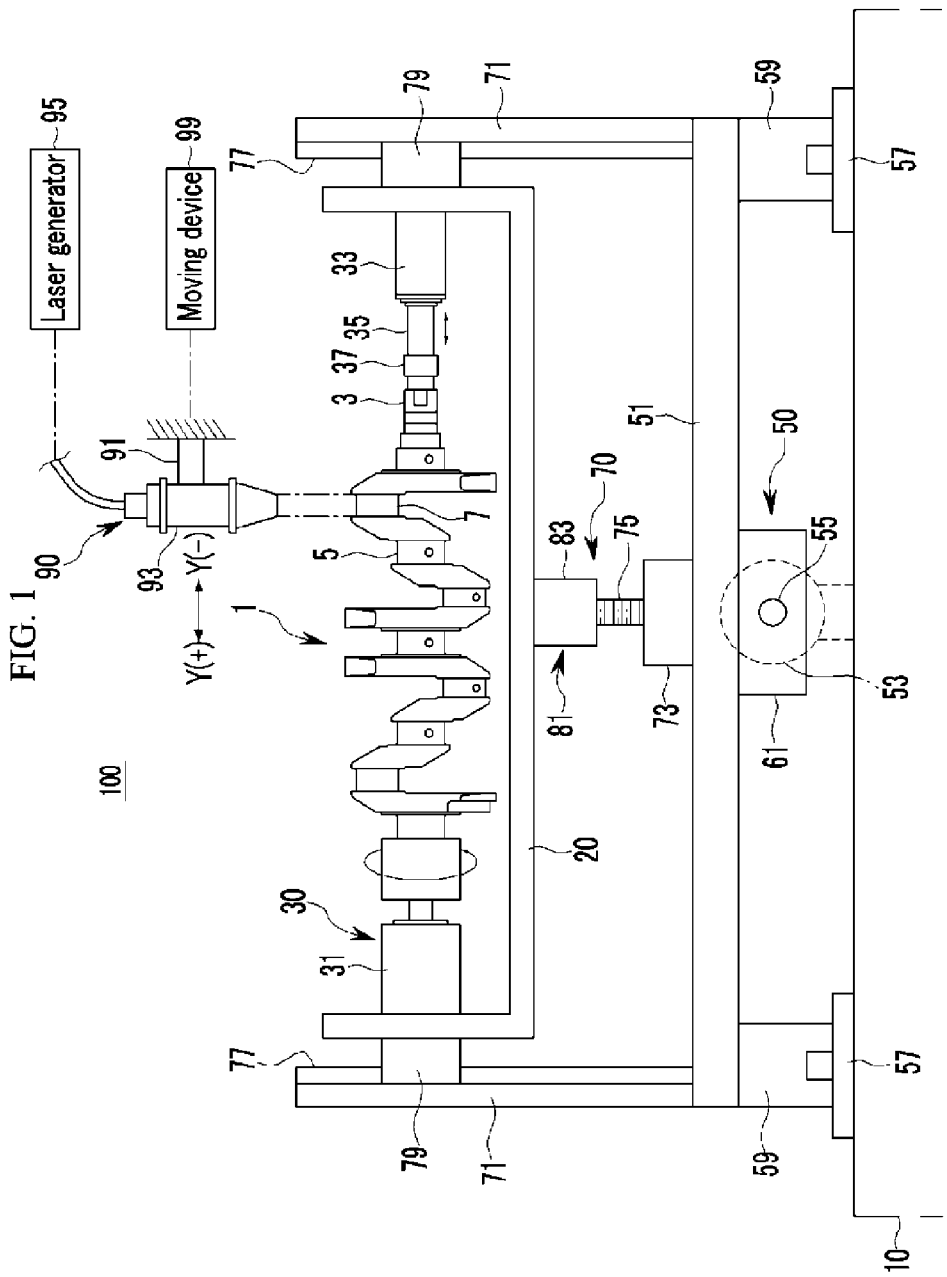
FIG. 1 is a frontal schematic diagram showing an exemplary crankshaft heat treatment device according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Accordingly, the drawings and description are to be regarded as illustrative in nature and not restrictive, and like reference numerals designate like elements throughout the specification.

The size and thickness of each element are arbitrarily shown in the drawings, and the present invention is not necessarily limited thereto, and in the drawings, the thickness of layers, films, panels, regions, etc., are exaggerated for clarity.

And, in the following detailed description, in order to distinguish constituent elements of the same name, the constituent elements have names of a first, a second, and a third, and the first, the second, and the third are not limited to order thereof.

In the specification, unless explicitly described to the contrary, the word "comprise" and variations such as "comprises" or "comprising", will be understood to imply the inclusion of stated elements but not the exclusion of any other elements.

Figure 2:
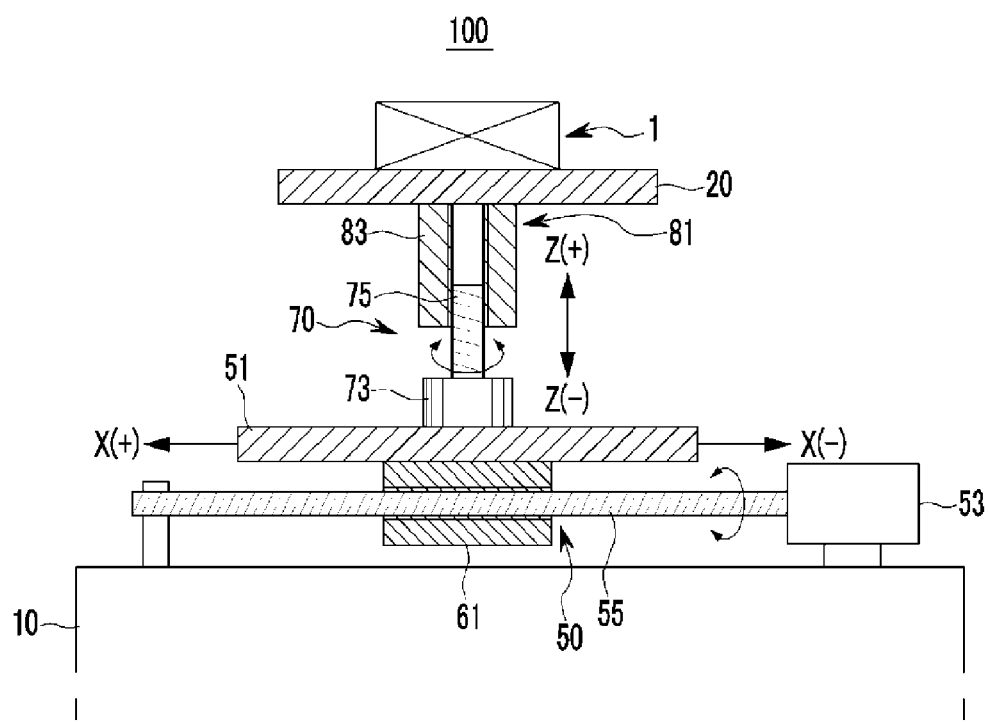
FIG. 2 is a sectional schematic diagram showing an exemplary crankshaft heat treatment device according to the present invention.

FIG. 1 is a frontal schematic diagram showing a crankshaft heat treatment device according to various embodiments of the present invention, and FIG. 2 is a sectional schematic diagram showing a crankshaft heat treatment device according to various embodiments of the present invention.

Referring to FIG. 1 and FIG. 2, a crankshaft heat treatment device 100 according to various embodiments of the present invention can be applied to an engine fabrication line that is used to fabricate a shaft component such as a crankshaft and a camshaft that are used for an engine of a vehicle.

For example, a shaft body is fabricated through an integral forging or a casting process in an engine fabrication line, and then the shaft body passes a mechanical and heat treatment process to be a crankshaft or a camshaft. Thus, one will appreciate that the crankshaft or camshaft may be monolithically formed.

Hereinafter, it will be described that a crankshaft heat treatment device 100 according to various embodiments of the present invention is used to treat the crankshaft 1 with heat.

The crankshaft 1 includes a journal portion 5 that is disposed on a rotation center axis 3 and a pin portion 7 that is eccentrically disposed from the rotation center axis 3 to be connected to a connecting rod.

However, it is not limited that the crankshaft heat treatment device 100 according to various embodiments of the present invention is used to treat the crankshaft 1 having the journal portion 5 and the pin portion 7 with heat, and the device 100 can be used to apply heat to another shaft components having an eccentric shaft from a rotation center axis besides the camshaft.

The crankshaft heat treatment device 100 according to various embodiments of the present invention irradiates laser beam on a rotating crankshaft 1 to be able to perform a laser heat treatment of the journal portion 5 and the pin portion 7.

Also, various embodiments of the present invention provides a crankshaft heat treatment device 100 that applies a circular arc interpolation jig to enable a laser heat treatment of the pin portion 7 that eccentrically rotates without a position compensation of a laser beam focus area.

For this, the crankshaft heat treatment device 100 according to various embodiments of the present invention includes a base frame 10, a jig frame 20, a rotation unit 30, a first moving unit 50, a second moving unit 70, and a laser unit 90.

Hereinafter, a front side is defined to X (+) direction as a left side direction based on FIG. 2, and a rear side is defined to X (−) direction as a right side direction. And, an upper side direction is defined to Z (+) direction and a lower side direction is defined to Z (−) direction.

Also, a direction that vertically crosses against X (+) and X (−) direction can be denoted Y (+) and Y (−) direction as a length direction of the crankshaft 1.

The base frame 10 is used to support any constituent elements to be able to include auxiliary elements such as any bracket, supporting block, plate, housing, cover, collar, and so on.

However, the auxiliary elements is used to mount each constituent elements on the base frame 10, and the auxiliary elements can be referred to as a base frame 10 in various embodiments of the present invention except exceptional case.

The jig frame 20 is a circular arc interpolation jig to rotatably support the crankshaft 1.

A crankshaft 1 is mounted on the jig frame 20 by a load unit in a condition that a fabrication is completed, and the jig frame 20 rotatably supports both ends of the crankshaft 1.

Here, the circular arc interpolation is a numerical control mechanical term that can be defined as one mode of an outline control using arranged data for generating circular arc.

In various embodiments of the present invention, the circular arc interpolation means compensating the position of the jig frame 20 in accordance with the eccentric position of the pin portion 7 based on the eccentric rotation of the pin portion 7 while the journal portion 5 and the pin portion 7 are treated with heat during the rotation of the crankshaft 1.

In a condition in which the circular arc interpolation is applied to the jig frame 20 and laser beam having position is applied to the pin portion 7 of the crankshaft 1, the eccentric amount of the pin portion 7 that eccentrically rotates is compensated by the position compensation of the jig frame 20, and all exterior circumference of the pin portion 7 is treated by the laser heat.

For this, a jig frame 20 according to various embodiments of the present invention is disposed to be movable in a horizontal direction as a front and a rear direction on the base frame 10 and to be able to move in an up and down direction.

That is, the jig frame 20 can be reciprocate in X(+) and X(−) direction and Z(+) and Z(−) direction on the base frame 10 by the first and the second moving units 50 and 70 that will be hereinafter described.

The rotation unit 30 rotatably supports the crankshaft 1 at the jig frame 20 and is used to rotate the crankshaft 1 in one side rotation direction on the jig frame 20.

The rotation unit 30 can be disposed at both sides of the jig frame 20. The rotation unit 30 includes a drive motor 31 that is disposed at one side of the jig frame 20 and a support cylinder 33 that is disposed at the other side of the jig frame 20.

The drive motor 31 is connected to one side end portion of the crankshaft 1, that is, one side end portion of the rotation center axis 3. The support cylinder 33 rotatably supports the other end side end portion of the crankshaft 1, that is, rotatably supports the other side end portion of the rotation center axis 3.

Here, the support cylinder 33 includes an operating rod 35 that is operated in a Y (+) and Y (−) direction in the FIG. 1 and the operating rod 35 is rotatably supported on the other side end portion of the crankshaft 1.

In this case, the support cylinder 33 can deal different length of the crankshaft 1 according to a kind of a vehicle and rotatably support the other side end portion of the crankshaft 1 through a front and rear movement of the operating rod 35.

And, the operating rod 35 of the support cylinder 33 is connected to the other side end portion of the crankshaft 1 through the bearing 37 that is disposed at a front end of the operating rod 35. The bearing 37 can safely support the crankshaft 1 that is rotated by the drive motor 31.

The first moving unit 50 is used to move the jig frame 20 that is connected to the second moving unit 70 in horizontal X(+) and X(−) direction in accordance with the rotating direction of the crankshaft 1. The first moving unit 50 can be configured on the base frame 10.

The first moving unit 50 includes the first moving plate 51, the first servo motor 53, and the first lead screw 55.

The first moving plate 51 can be disposed to be movable in X(+) and X(−) direction on the base frame 10 in accordance with the rotating direction of the crankshaft 1.

The first moving plate 51 is disposed on the first guide rail 57 disposed at an upper surface of the base frame 10 to be slidably movable in X (+) and X (−) direction through the first rail block 59.

The first guide rail 57 is disposed on an upper surface both side portions of the base frame 10 to be fixed in X (+) and X (−) direction. The first rail block 59 is fixed on a lower surface both side portions of the first moving plate 51 and is engaged with the first guide rail 57 to be slidably movable in X(+) and X(−) direction.

The first servo motor 53 can control its rotating direction and its rotation speed to be fixed on an upper surface of the base frame 10 that corresponds to the first moving plate 51.

And, the first lead screw 55 that transforms the rotation stroke of the first servo motor 53 to the linear stroke of the first moving plate 51 is connected to the drive shaft of the first servo motor 53 and is engaged with the first fixation block 61 fixed on a lower surface of the first moving plate 51 through a screw structure.

Accordingly, because the first fixation block 61 that is fixed on a lower surface of the first moving plate 51 is connected to the first servo motor 53 through the first lead screw 55, the first moving plate 51 can be moved along the first guide rail 57 in X (+) and X (−) direction by the forward/backward direction rotation of the first servo motor 53.

The second moving unit 70 is used to move the jig frame 20 on the first moving unit 50 in an up and down Z (+) and Z (−) direction in accordance with the rotating direction of the crankshaft 1. The second moving unit 70 can be configured on the first moving unit 50.

The second moving unit 70 includes a guide element 71, a second servo motor 73, and a second lead screw 75.

The guide element 71 is vertically disposed at an upper surface both sides of the first moving plate 51 in an up and down direction. Both sides of the jig frame 20 is engaged with the guide element 71 to be slidably movable in an up and down direction.

Here, both sides of the jig frame 20 can be engaged with the second guide rail 77 formed on the guide element 71 through the second rail block 79 to be movable in Z (+) and Z (−) direction.

That is, the second rail block 79 is fixed on both sides of the jig frame 20 and is mounted on the second guide rail 77 to be movable in Z (+) and Z (−) direction.

The second servo motor 73 can control its rotating direction and rotation speed and is mounted on an upper surface of the first moving plate 51 that corresponds to a lower surface of the jig frame 20. The second servo motor 73 is vertically disposed on an upper surface of the first moving plate 51 and is vertically disposed on a lower side surface of the jig frame 20.

And, the second lead screw 75 that transforms the rotation stroke of the second servo motor 73 to the linear stroke of the jig frame 20 is connected to the drive shaft of the second servo motor 73, and is engaged with the second fixation block 81 that is fixed on a lower surface of the jig frame 20 through a screw method.

Here, as an example, the second fixation block 81 that an upper end thereof is fixed on a lower surface of the jig frame 20 and a lower end thereof is engaged with the second lead screw 75 can be a pipe nut 83 that a lower end thereof is engaged.

Accordingly, because the second fixation block 81 that is fixed on a lower surface of the jig frame 20 is connected to the second servo motor 73 through the second lead screw 75, the jig frame 20 can be moved along the second guide rail 77 of the guide element 71 by the forward/backward direction rotation of the second servo motor 73 in Z (+) and Z (−) direction.

Meanwhile, in various embodiments of the present invention, the laser unit 90 irradiates laser beam onto the journal portion 5 and the pin portion 7 of the crankshaft that rotates on the rotation unit 30 at an upper side of the jig frame 20 so as to treat the journal portion 5 and the pin portion 7 with the laser beam heat.

The laser unit 90 includes a laser optic heat 93 that is mounted on a predetermined moving device 99 through the mounting bracket 91.

The laser optic head 93 irradiates the laser beam generated by the laser generator 95 on the journal portion 5 and the pin portion 7 of the crankshaft 1 that rotates on the jig frame 20.

The laser optic head 93 irradiates laser beam from a predetermined position. In this case, the position of the laser optic head 93 is fixed or varied by the moving device 99 that is described above.

Here, the moving device 99 like multi axis control robot and two axis robot is used to move a predetermined element, can be disposed on the base frame 19, or can be disposed on another frame.

The moving device 99 is otherwise conventional, and therefore the detailed description thereof will be omitted.

Meanwhile, the laser optic head 93 according to various embodiments of the present invention is disposed to be moved by the moving device 99 in Y (+) and Y (−) direction as a horizontal direction vertically crossing with X (+) and X (−) direction in the FIG. 1.

In this case, the laser optic head 93 can apply laser beam of conduction welding area on the journal portion 5 and the pin portion 7 of the crankshaft 1. That is, the laser optic head 93 uses a heat conduction characteristic of a laser beam of a conduction welding area to treat the journal portion 5 and the pin portion 7 with heat.

The above laser beam of conduction welding area is laser beam having none focus area having a beam area that is several times wider than a focus size. And, the density of the laser beam of conduction welding area is lower than that of a focus position, but the laser beam generates heat conduction phenomenon which that effectively enables heat treatment.

Hereinafter, the operation of the crankshaft heat treatment device 100 according to various embodiments of the present invention will be described with reference to the drawings.

Figure 3:
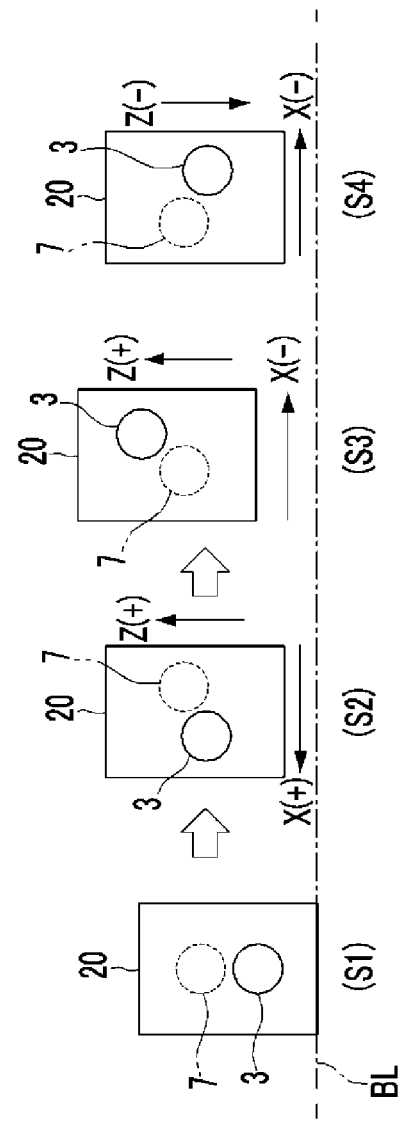
FIG. 3 is a drawing for describing the operation of an exemplary crankshaft heat treatment device according to the present invention.

FIG. 3 is a drawing for describing the operation of a crankshaft heat treatment device according to various embodiments of the present invention.

With reference to the previous described drawings, both end portions of the crankshaft 1 is engaged with the rotation unit 30 of the jig frame 20 in various embodiments of the present invention.

Here, one side end portion of the crankshaft 1, that is one side end portion of the rotation center axis 3 is connected to the drive motor 31, and the other end portion of the crankshaft 1 that is the other end portion of the rotation center axis 3 is rotatably connected to the operating rod 35 of the support cylinder 33 through the bearing 37.

In this case, the support cylinder 33 uses the forward/backward operation of the operating rod 35 to rotatably support the other side end portion of the crankshaft 1 such that different length of the crankshaft 1 can be supported depending on a kind of a vehicle.

In various embodiments of the present invention, the drive motor 31 of the rotation unit 30 is operated to rotate the crankshaft 1 in one side direction through the above rotation unit 30 in a condition that the crankshaft 1 is mounted on the jig frame 20.

In this process, the laser beam that is generated from the laser generator 95 is applied to the journal portion 5 and the pin portion 7 of the crankshaft 1 that rotates on the jig frame 20 through the laser optic head 93 in various embodiments of the present invention such that the section of the journal portion 5 and the pin portion 7 is treated with heat.

In this case, the laser optic head 93 moves in Y (+) and Y (−) direction as a horizontal direction by the moving device 99, and the laser beam can be applied to the journal portion 5 and the pin portion 7 in a condition that the head 93 is fixed by the moving device 99.

Meanwhile, while the crankshaft 1 is treated with heat by applying laser beam through the laser optic head 93 to the crankshaft 1 that rotates 360 degrees, because the journal portion 5 is disposed on a rotation center axis 3 of the crankshaft 1, the section of the journal portion 5 can be treated with heat without position compensation of the jig frame 20.

However, because the pin portion 7 is eccentrically disposed from the rotation center axis 3, the pin portion 7 eccentrically rotates when the crankshaft 1 rotates based on the rotation center axis 3.

Therefore, as shown in S1 of FIG. 3, when the pin portion 7 is positioned on an upper side home state of the rotation center axis 3 in various embodiments of the present invention, the jig frame 20 is positioned on a base line (BL) without a separate position compensation. In this condition, the laser optic head 93 irradiates laser beam on the pin portion 7.

Thereafter, when the pin portion 7 is eccentrically rotated in a predetermined section as shown in S2 of FIG. 3, the jig frame 20 is moved by the first moving unit 50 in X (+) direction and simultaneously is moved by the second moving unit 70 in Z (+) direction from the base line BL as much as the eccentricity amount of the pin portion 7 in various embodiments of the present invention.

When the pin portion 7 is continuously eccentrically rotated, as shown in S3 of FIG. 3, the jig frame 20 is moved in X (−) direction by the first moving unit 50 and simultaneously is moved by the second moving unit 70 in Z (+) direction as much as the related eccentricity amount of the pin portion 7 in various embodiments of the present invention.

Thereafter, when the pin portion 7 continuously eccentrically rotates in a predetermined section, as shown in S4 of FIG. 3, the jig frame 20 is moved by the first moving unit 50 in X (−) direction and is simultaneously moved by the second moving unit 70 in Z (−) direction toward the base line (BL) as much as the related eccentricity amount of the pin portion 7 in various embodiments of the present invention.

Accordingly, the eccentricity position of the jig frame 20 is compensated on real time bases in accordance with the eccentricity rotation position of the pin portion 7 through a circular arc interpolation method of the jig frame 20 in various embodiments of the present invention.

Thereby, the laser beam of the laser optic head 93 that is fixed on a predetermined position is applied to the pin portion 7 that eccentrically rotates such that the pin portion 7 is treated by laser heat in various embodiments of the present invention.

As described above, a crankshaft heat treatment device 100 according to various embodiments of the present invention applies laser beam on the crankshaft 1 to be able to treat the journal portion 5 and the pin portion 7 with laser heat, wherein a facility investment cost is reduced compared with a high frequency heat treatment method.

Also, because the position of the jig frame 20 is compensated by a circular arc interpolation method based on the pin portion 7 of the crankshaft 1 that eccentrically rotates, the laser beam of the laser optic head 93 is applied to the pin portion 7 at a fixed position in various embodiments of the present invention.

Accordingly, because the focus area compensation of the laser beam is not necessary in various embodiments of the present invention, the structure of the laser optic head 93 can be simple.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A crankshaft heat treatment device, comprising:
   a base frame;
   a jig frame in which a crankshaft is rotatably supported and disposed to move in a horizontal direction and in a vertical direction with respect to the base frame;
   a laser unit disposed in a predetermined position and irradiating a laser beam to a pin portion and a journal portion of the crankshaft so as to treat the pin portion and the journal portion, respectively, with heat;
   a rotation unit disposed on the jig frame to rotate the crankshaft;
   a first moving unit disposed on the base frame to move the jig frame substantially perpendicular to a central axis of the crankshaft in a horizontal direction; and
   a second moving unit disposed on the first moving unit to move the jig frame substantially perpendicular to a central axis of the crankshaft in an up and down direction.

2. The crankshaft heat treatment device of claim 1, wherein a circular arm interpolation of the jig frame is performed based on an eccentric rotation of the pin portion with respect to the jig frame.

3. The crankshaft heat treatment device of claim 1, wherein the rotation unit includes:
   a drive motor disposed at a first side of the jig frame to be connected to a first side end portion of the crankshaft; and
   a support cylinder disposed at a second side end of the jig frame to rotatably support a second side end portion of the crankshaft.

4. The crankshaft heat treatment device of claim 3, wherein the support cylinder rotatably supports the second side end portion of the crankshaft through an operation of an operating rod to correspond to the second side end portion of the crankshaft.

5. The crankshaft heat treatment device of claim 3, wherein an operating rod of the support cylinder is connected to the second side end portion of the crankshaft through a bearing.

6. The crankshaft heat treatment device of claim 1, wherein the first moving unit includes:
   a first moving plate disposed on the base frame and movable in a horizontal direction along a rotating direction of the crankshaft;
   a first servo motor disposed on the base frame to correspond to the first moving plate; and
   a first lead screw connected to the first fixation block fixed on a lower surface of the first moving plate and the first servo motor.

7. The crankshaft heat treatment device of claim 6, wherein the first moving plate is disposed on the first guide rail disposed on an upper surface of the base frame to be movable in a horizontal direction through the first rail block.

8. The crankshaft heat treatment device of claim 6, wherein the second moving unit includes:
   a guide element disposed at opposing sides of the first moving plate in the up and down direction, and opposing sides of the jig frame are engaged with the guide element to be slidably movable in the up and down direction;
   a second servo motor disposed on an upper surface of the first moving plate to correspond to a lower surface of the jig frame; and
   a second lead screw connected to the second fixation block fixed on a lower surface of the jig frame and the second servo motor.

9. The crankshaft heat treatment device of claim 8, wherein the jig frame is disposed on the second guide rail formed on the guide element to be movable in the up and down direction through the second rail block.

10. The crankshaft heat treatment device of claim 1, wherein the second moving unit includes:
    a guide element disposed on the first moving unit, wherein opposing sides of the jig frame are engaged with the guide element to be slidably movable in the up and down direction;
    a second servo motor disposed on the first moving unit to correspond to the jig frame; and
    a second lead screw connected to the second fixation block fixed on a lower surface of the jig frame and the second servo motor.

11. The crankshaft heat treatment device of claim 10, wherein the second fixation block is a pipe nut fixed on a lower surface of the jig frame in the up and down direction.

12. The crankshaft heat treatment device of claim 1, wherein the laser unit includes a laser optic head disposed on a predetermined moving device through a mounting bracket and irradiates a laser beam generated by a laser generator onto the pin portion and the journal portion of the crankshaft.

13. The crankshaft heat treatment device of claim 12, wherein the laser optic head is disposed to be movable in a horizontal direction along axis Y through the moving device, when a horizontal moving direction of the jig frame is defined as an axis X.

14. The crankshaft heat treatment device of claim 12, wherein the laser optic head irradiates a laser beam of conduction welding onto the pin portion and the journal portion.

* * * * *